Feb. 9, 1926.  1,572,349

J. R. CHAMBERLIN

ROTARY CORE DRILL BIT

Filed June 19, 1922

John R. Chamberlin, Inventor

By his Attorney

Cooper, Kerr & Dunham

Patented Feb. 9, 1926.

1,572,349

UNITED STATES PATENT OFFICE.

JOHN R. CHAMBERLIN, OF BRONXVILLE, NEW YORK.

ROTARY-CORE DRILL BIT.

Application filed June 19, 1922. Serial No. 569,356.

*To all whom it may concern:*

Be it known that I, JOHN R. CHAMBERLIN, a citizen of the United States of America, residing at Bronxville, in the county of Westchester and State of New York, have invented certain new and useful Improvements in Rotary-Core Drill Bits, of which the following is a full, clear, and exact description.

The present invention relates to rotary core drill bits.

The object of the invention is to provide a drill bit of a suitable material such as aluminum or an alloy thereof and in which is incorporated in its cutting end an abrasive material, such as carborundum crystals, although other metals and cutting crystals may be used.

Figure 1:
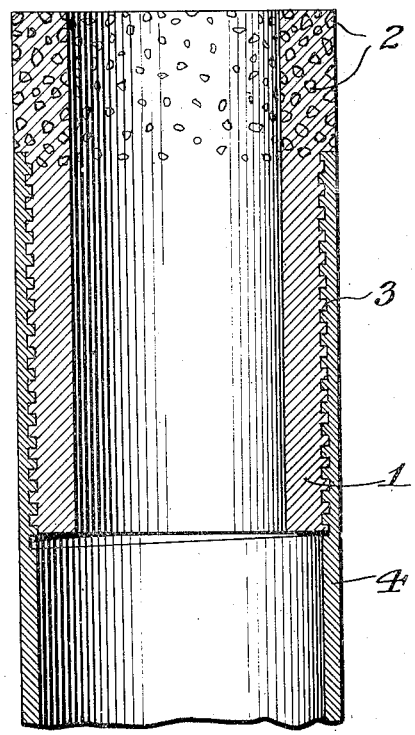
Figure 2:
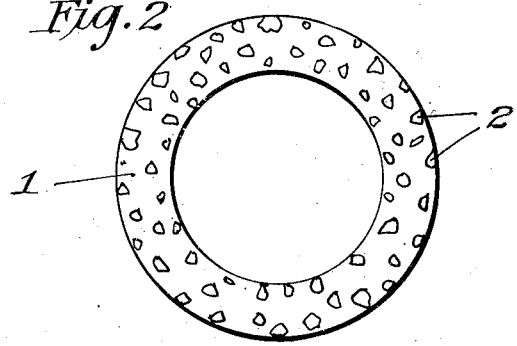

By way of illustration I have shown one form of my invention in the accompanying drawings in which:

Figure 1 is a vertical section of a rotary core drill bit, and Figure 2 is a plan view thereof.

Referring to the drawings, 1 is the rotory core drill bit preferably of aluminum or an alloy thereof, although it may be made of iron, copper, bronze, etc., in which a quantity of cutting crystals 2, is incorporated in the cutting end of said bit, a relatively soft metal forming a perfect binding agent and filling all voids between the crystals, without impairing the tensile strength of the bit. These crystals preferably are carborundum crystals of large size although corundum, garnet, alunite, etc., may be utilized in place of the carborundum. At 3 a screw thread connection is shown with a core barrel 4 which in the usual practice of drilling is connected with suitable rotating drill rods (not shown).

In drilling operations, the drill rods are driven from a suitable source of power and these drill rods in turn rotate the core barrel and the rotary core drill bit mounted thereon. The rotary motion of the drill bit edge against a hard substance, such as rock formation, brings the cutting edges of the carborundum crystals into play against said substance and causes a cutting or boring of the said substance to take place. Continued cutting or boring will wear away the crystals first exposed and the metal holding them in position, whereupon the crystals in the rear of those first exposed will come into play and take their place as cutting or boring agents in the boring operation. This will continue until the bit 1 is worn down to a point where the cutting crystals are all used up, whereupon a new bit 1 is substituted for the old one and the boring operation resumed, all in the usual manner.

In the manufacture of my new bit, I prefer to use a metal such as aluminum, or one of its alloys, as the metal of the bit and to use corborundum crystals of large size as the cutting material, as said metal or metals are lighter than the carborundum and in casting of the bits where the carborundum crystals are first put in the bottom of the mold there is less tendency for the crystals to float toward the top of the bit. This insures that the maximum number of crystals will be at a point in the bit where they can be all availed of in the cutting or boring operation.

To insure that the crystals will be at the cutting end of the bit, in another method of manufacture, the crystals are first packed into a capsule of readily fusible material, such as lead, zinc, etc., and placed in the bottom of the mold, and in casting the bit in the mold, either by gravity or pressure, the heat of the cast metal will melt the capsule and the metal of the bit and capsule thereupon flows in around the crystals and binds them together in the end of the bit.

By virtue of the construction of rotary core drill bits above described, drilling operations through rock formation are carried on in circulating water at higher speeds of rotation than heretofore customary.

What I claim is:

1. A rotary core drill bit comprising an aluminum tube and cutting crystals incorporated only in one end thereof.

2. A rotary core drill bit comprising an aluminum tube and carborundum crystals incorporated in one end thereof.

In testimony whereof I hereto affix my signature.

JOHN R. CHAMBERLIN.